United States Patent [19]

Chung

[11] Patent Number: 5,400,215
[45] Date of Patent: Mar. 21, 1995

[54] SUPPORT STRUCTURE FOR A VEHICLE-DATA RECORDER HAVING A BEARING PLATE WITH CASTERS

[76] Inventor: Pao-Lang Chung, No. 92, Pen Kuan Rd., Niao Sung Hsiang, Kaohsiung Hsien, Taiwan, Prov. of China

[21] Appl. No.: 9,979

[22] Filed: Jan. 27, 1993

[51] Int. Cl.[6] ................... H05K 7/10; H01R 13/627
[52] U.S. Cl. .................. 361/684; 361/686; 361/726; 361/727; 361/732; 361/740; 361/741; 361/747; 312/334.39; 439/350; 439/377
[58] Field of Search ............... 364/708.1; 400/692; 312/223.2, 334.37, 334.38, 334.39; 248/27.1, 27.3; 439/297, 298, 350, 353, 354, 357, 358, 377, 476, 483; 361/684, 686, 725–727, 732, 737, 740, 741, 747, 752

[56] References Cited

U.S. PATENT DOCUMENTS 4,397,511  8/1983  Clark et al. ................. 361/684
4,979,909  12/1990  Andrews ..................... 439/354 X
5,038,235  8/1991  Ohzawa et al. ............... 360/137

*Primary Examiner*—Michael W. Phillips
*Attorney, Agent, or Firm*—Leydig, Voit & Mayer

[57] ABSTRACT

A structure for detachably supporting a vehicle-data recorder has (a) a station attachable to a vehicle and including a first port for communicating with a data-detecting device for a vehicle employing the vehicle-data recorder and an opening and (b) a cassette insertable in the station through the opening and comprising a second port for communicating with the port of the station. The station has (a) a top, (b) a bottom, (c) a front wall in which the opening is formed, (d) a rear wall on which the first port is mounted, (e) two lateral walls comprising two positioning blocks facing each other, each of the positioning blocks having a front wedge surface and a recess behind the wedge surface, and (f) a bearing plate mounted opposite the top and comprising two leave springs supporting two casters. The cassette has (a) a top, (b) a bottom, (c) a front wall, (d) a rear wall on which the second port is mounted and (e) two lateral walls comprising two protrusions engaging in the recesses when the cassette is received in the station for firmly retaining the cassette in the station. Two casters contact the bottom of the cassette when the cassette is inserted into the opening of the station.

2 Claims, 3 Drawing Sheets

SUPPORT STRUCTURE FOR A VEHICLE-DATA RECORDER HAVING A BEARING PLATE WITH CASTERS

BACKGROUND OF INVENTION

1. Field of Invention

The present invention relates to a detachable structure for a recorder for vehicle data.

2. Related Prior Art

For convenience of management of business vehicles, it is preferable to record vehicle data, e.g., the revolutions per minute (RPM) of the engine, the temperature of the engine, the fuel amount, speed, and miles traveled. Recorders have been employed for recording such vehicle data. However, it is desirable for the recorders to be detachable.

SUMMARY OF INVENTION

It is an object of the present invention to provide a structure for detachably supporting a vehicle-data recorder.

For a better understanding of the present invention and objects thereof, a study of the detailed description of the embodiments described hereinafter should be made in relation to the accompanying drawings.

DETAILED DESCRIPTION OF PREFERRED EMBODIMENT

The present invention will be described in detail with reference to the drawings showing a preferred embodiment of the present invention.

Figure 1:
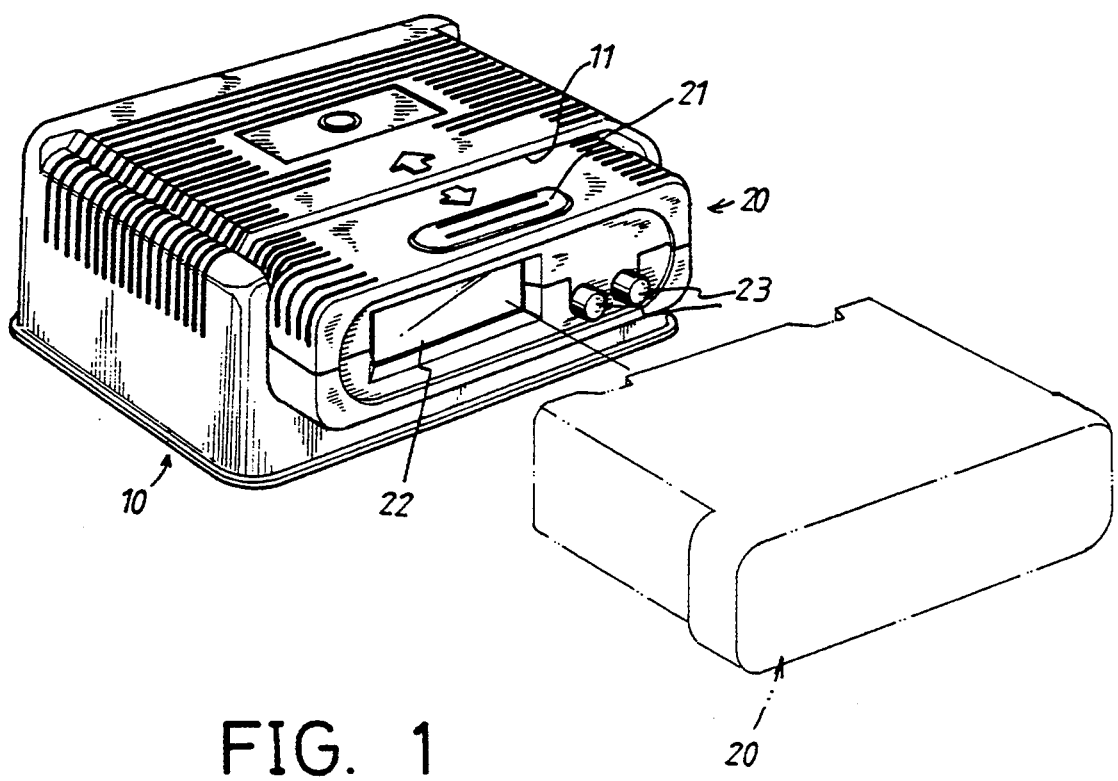
FIG. 1 is a perspective view of a structure for detachably supporting a vehicle-data recorder in accordance with the preferred embodiment of the present invention.

Initially referring to FIG. 1, a structure for detachably supporting a vehicle-data recorder has a station 10 and a cassette 20. In use, the station 10 is securely attached to a vehicle.

Figure 2:
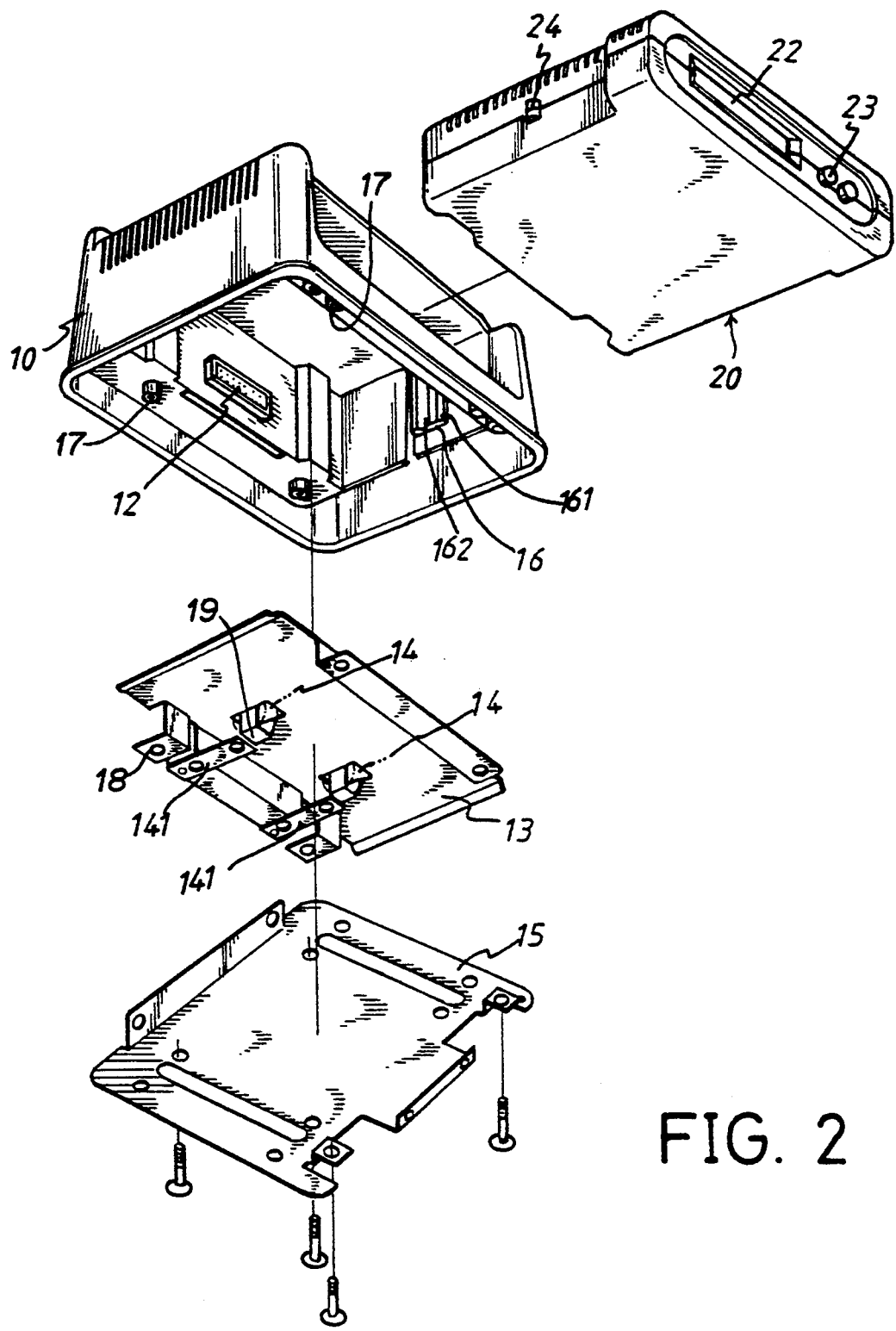
FIG. 2 is an exploded view of the preferred embodiment of the present invention.

Additionally referring to FIG. 2, the station 10 has a top, a front wall, a rear wall, two lateral walls and a bottom. The top, the front wall, the rear wall and the two lateral walls integrate with one another. The front wall defines an opening 11 for permitting the cassette 20 to enter the station 10. A port 12 is mounted on the rear wall, for communicating with a data-detecting device mounted in the vehicle. Two positioning blocks 16 (only one is shown) are respectively formed on the lateral walls. Each of the positioning blocks 16 has a front wedge surface 161 and a vertical recess 162 behind the wedge surface 161. A number of bosses 17 are formed beneath the front wall and the rear wall.

The station further has a bearing plate 13. The bearing plate 13 has a number of holes 18 formed therein corresponding to the bosses 17 formed beneath the front wall and rear wall. Two leaf springs 141 are securely attached in parallel beneath the bearing plate 13. Each of the leaf springs 141 has a first end and a second end. The first ends of the leaf springs 141 are securely attached to the rear wall. Each of two brackets 19 is securely attached on the second end of a corresponding one of the leaf springs 141. Two casters 14 are mounted on the brackets. The casters are received in two slots formed in the plate 13.

The bottom 15 has a number of holes corresponding to the holes 18 defined in the bearing plate 13. A number of screws are inserted through the holes defined in the bottom 15 and the holes 18 defined in the bearing plate 13, and secured in the bosses 17 formed beneath the front wall and the rear wall. Thus, the station 10 is completed.

The cassette 20 has a top (not shown), a bottom, a front wall, a rear wall and two lateral walls. A display 22 is situated on the front wall of the cassette for showing the vehicle data. Two buttons 23 are mounted on the front wall of the cassette 20 for selecting different modes of vehicle data. The buttons 23 are operatively linked to a circuit arranged in the cassette 20. The circuit is not the spirit of the present invention and details thereof will not be given. A port (not shown) operatively linked to the circuit arranged in the cassette 20 is situated on the rear wall of the cassette 20, for operatively communicating with the port 12. Two protrusions 24, the purpose of which is mentioned later, are respectively formed on the lateral walls of the cassette 20.

Figure 3:
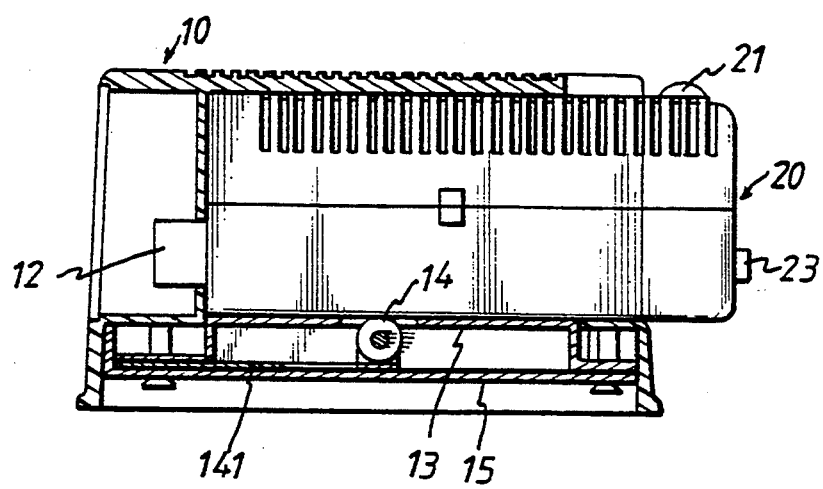
FIG. 3 is a vertical cross-sectional view of the preferred embodiment of the present invention.

As shown in FIG. 3, the cassette 20 is inserted into the station 10 through the opening 11. The casters 14 biased by means of the leaf springs 141 contact the bottom of the cassette 20 for reducing the friction between the bearing plate 13 and the bottom of the cassette 20.

Figure 4:
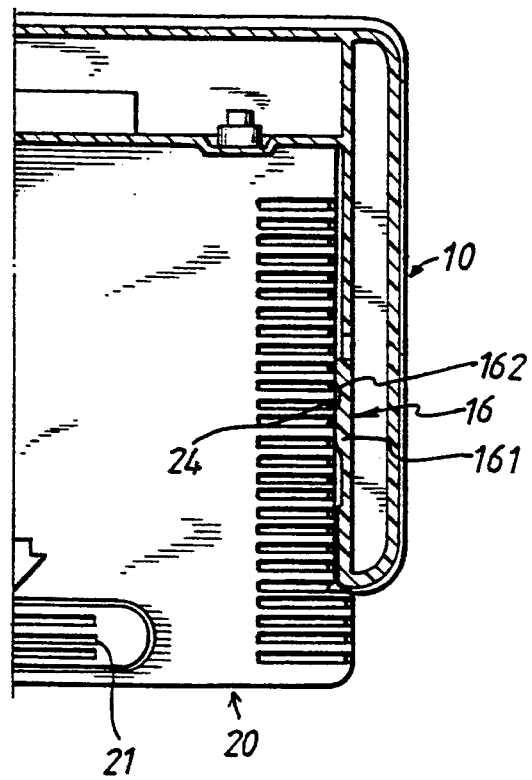
FIG. 4 is a horizontal cross-sectional partial view the preferred embodiment of the present invention.

As shown in FIG. 4, the protrusions 24 pass on and by the wedge surfaces 161, and engage in the recesses 162. The cassette 20 is thus firmly disposed in the station 10. The protrusions 24 and recesses 162 have smooth profiles so that they can disengage from each other. A grasp element 21 is formed on the top of cassette 20, for extracting the cassette 20.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

I claim:

1. A structure for detachably supporting a vehicle-data recorder comprising:

a station attachable to a vehicle and comprising a top, a bottom, a front wall in which an opening is formed, a rear wall, a first port mounted on the rear wall for communicating with a data-detecting device for the vehicle, two lateral walls comprising two positioning blocks facing each other, each of the positioning blocks having a front wedge surface and a recess behind the wedge surface, and a bearing plate mounted opposite said top and comprising two leaf springs supporting two casters; and a cassette insertable into the station through the opening and comprising a top, a bottom, a front wall, a rear wall, a second port for communicating with the first port mounted on the rear wall of the cassette, and two lateral walls comprising two protrusions engaging in the recesses when the cassette is received in the station for firmly retaining the cassette in the station, the casters contacting the bottom of the cassette when the cassette is disposed in the station for smooth movement of the cassette in the station.

2. A structure in accordance with claim 1 further comprising a grasp element formed on the top of the cassette.

* * * * *